US007548000B2

(12) United States Patent
Urbahn et al.

(10) Patent No.: US 7,548,000 B2
(45) Date of Patent: Jun. 16, 2009

(54) MULTILAYER RADIATION SHIELD

(75) Inventors: John Arthur Urbahn, Saratoga Springs, NY (US); Evangelos Trifon Laskaris, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 886 days.

(21) Appl. No.: 10/968,444

(22) Filed: Oct. 18, 2004

(65) Prior Publication Data

US 2006/0082228 A1 Apr. 20, 2006

(51) Int. Cl.
*H02K 9/00* (2006.01)
(52) U.S. Cl. .......................................... 310/54; 310/64
(58) Field of Classification Search ............. 310/52–64; 505/876–878
See application file for complete search history.

(56) References Cited

U.S. PATENT DOCUMENTS

| 3,447,003 | A | * | 5/1969 | Cooper et al. ................. 310/54 |
| 3,648,082 | A | * | 3/1972 | MacNab et al. ............... 310/10 |
| 4,001,617 | A | * | 1/1977 | Boyer .......................... 310/52 |
| 4,123,677 | A | | 10/1978 | Laskaris et al. ............... 310/52 |
| 4,164,126 | A | | 8/1979 | Laskaris et al. ................ 62/55 |
| 4,236,091 | A | * | 11/1980 | Kutateladze et al. .......... 310/64 |
| 4,356,700 | A | | 11/1982 | Eckels et al. .................. 62/55 |
| RE33,186 | E | * | 3/1990 | Mori et al. ................... 148/409 |
| 5,747,913 | A | * | 5/1998 | Amlee et al. ................ 310/263 |
| 5,903,083 | A | * | 5/1999 | Mukai et al. ................ 310/263 |
| 6,404,097 | B1 | * | 6/2002 | Pullen ........................ 310/268 |
| 6,412,289 | B1 | | 7/2002 | Laskaris et al. .............. 62/50.7 |
| 2002/0170298 | A1 | | 11/2002 | Laskaris et al. ................ 62/64 |

OTHER PUBLICATIONS

Sears et al, University Physics, Sixth Edition, 1982, p. 96.*

* cited by examiner

*Primary Examiner*—Dang D Le
(74) *Attorney, Agent, or Firm*—Flectcher Yoder

(57) ABSTRACT

A power generation system including: a generator including a rotor including a superconductive rotor coil coupled to a rotatable shaft; a first prime mover drivingly coupled to the rotatable shaft; and a thermal radiation shield, partially surrounding the rotor coil, including at least a first sheet and a second sheet spaced apart from the first sheet by centripetal force produced by the rotatable shaft. A thermal radiation shield for a generator including a rotor including a superconductive rotor coil including: a first sheet having at least one surface formed from a low emissivity material; and at least one additional sheet having at least one surface formed from a low emissivity material spaced apart from the first sheet by centripetal force produced by the rotatable shaft, wherein each successive sheet is an incrementally greater circumferential arc length and wherein the centripetal force shapes the sheets into a substantially catenary shape.

31 Claims, 6 Drawing Sheets

MULTILAYER RADIATION SHIELD

STATEMENT REGARDING FEDERALLY SPONSORED RESEARCH & DEVELOPMENT

This invention was made with Government support under contract number DE-FC36-02G011100 awarded by U.S. Department of Energy. The Government has certain rights in the invention.

BACKGROUND

The present invention relates generally to a rotating electrical machine employing a superconductive coil. More particularly, the present invention relates to a multilayer radiation shield for insulating a superconductive rotor coil for a rotating electrical machine.

Rotating electrical machines, such as motors and generators, have a rotor and a stator that are magnetically coupled. Typically, the rotor has a coil that is used to produce a magnetic field. Electricity flowing through the rotor coil produces the magnetic field. In a generator, the rotor is coupled to a prime mover that rotates the rotor, producing a rotating magnetic field that induces a voltage in the stator. The voltage produced in the stator may be used to supply power to an electrical grid. In a motor, the stator produces a rotating magnetic field that interacts with the magnetic field produced by the rotor coil to induce rotation of the rotor.

Conventional copper conductors are commonly used to form the rotor coils. However, the electrical resistance of copper is sufficient to produce a substantial amount of resistive heat losses in the rotor coil, which reduces the efficiency of the rotating machine. In response to the losses caused by conventional copper conductors, superconductors have been developed for use as rotor coils. A superconductor is a material that loses its electrical resistance below a characteristic transition temperature, making it desirable for use as a rotor coil.

In rotating machines employing a superconductive rotor coil, the rotor coil is cooled by a cryogenic fluid to lower the temperature of the superconductive coil below the transition temperature. Below the transition temperature, the superconductive rotor coil enters a superconducting state and loses its electrical resistance. Typically, a cryogenic fluid is provided to the superconductive coil by an external source of cryogenic fluid. The cryogenic fluid absorbs heat from the superconductive rotor coil, which maintains the rotor coil below the transition temperature and in a superconducting state. An insulating material may also be applied between the superconductive coil and the rotor body and surrounding structure. Such insulating material may be a multi-layer insulation application. A low conductivity spacer may be provided between the insulation layers to maintain separation of the multiple layers.

However, a number of problems are associated with providing a low conductivity physical spacer to maintain a separation between successive layers of insulating sheets of a multi-layer insulation application. Most notably, conventional multi-layer insulation applications will crush under centripetal loads present in rotating electrical machines, rendering the conventional multi-layer insulation application ineffective.

There is a need, therefore, for an improved technique for insulating a superconductive rotor coil for a rotating electrical machine. There is a particular need for a multilayer technique, which can be employed to insulate a superconductive rotor coils that does not crush under centripetal loads present in rotating machines.

BRIEF DESCRIPTION

In accordance with one aspect of the present technique, a power generation system is provided. In one embodiment, the power generation system comprises: a generator comprising a rotor including a superconductive rotor coil coupled to a rotatable shaft; a first prime mover drivingly coupled to the rotatable shaft; and a thermal radiation shield, partially surrounding the rotor coil, comprising at least a first sheet and a second sheet spaced apart from the first sheet by centripetal force produced by the rotatable shaft.

In accordance with another aspect of the present technique, a thermal radiation shield for a generator comprising a rotor including a superconductive rotor coil is provided. In one embodiment, the thermal radiation shield comprises: a first sheet having at least one surface formed from a low emissivity material; and at least one additional sheet having at least one surface formed from a low emissivity material spaced apart from the first sheet by centripetal force produced by the rotatable shaft, wherein each successive sheet is an incrementally greater circumferential arc length and wherein the centripetal force shapes the sheets into a substantially catenary shape.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
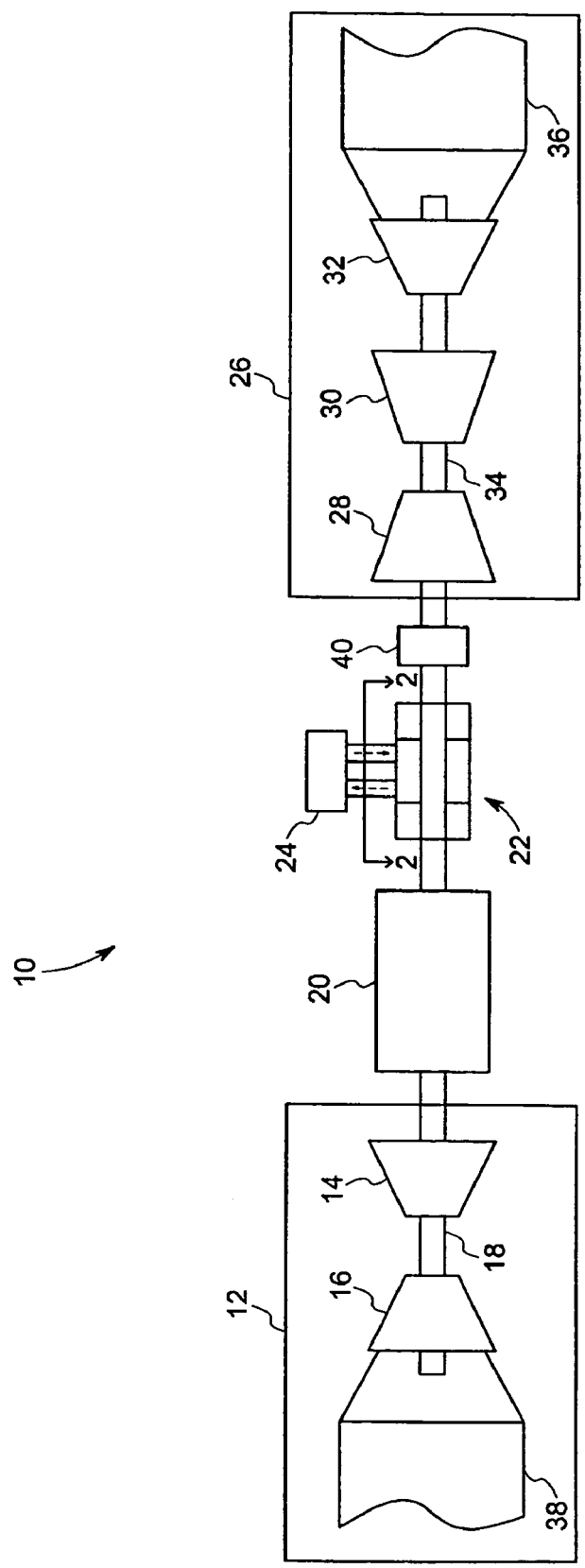
FIG. 1 is a schematic diagram of a power generation system, in accordance with an exemplary embodiment of the present technique.

Turning now to the drawings, FIG. 1 illustrates a power generation system, represented generally by reference numeral 10. In the illustrated embodiment, the power generation system 10 comprises a gas turbine system 12 that uses the combustion of a gas to generate power. The illustrated gas turbine system 12 comprises a compressor 14 that is coupled to a gas turbine 16 via a rotatable shaft 18. The gas turbine 16 converts the energy produced by the combustion into rotation of the shaft 18. The compressor 14 raises the pressure of the air flowing into the gas turbine 16 for combustion, improving the efficiency of the combustion process.

The shaft 18 of the gas turbine system 12 is coupled to a generator 20, which converts the rotational energy in the shaft 18 into electricity. As will be discussed in more detail below, the generator 20 has a superconductive rotor coil that receives cryogenic fluid to cool the superconductive rotor coil to a superconducting state. The cryogenic fluid is supplied to the superconductive rotor coil through the shaft 18. A cryogenic transfer coupling 22 is provided to transfer cryogenic fluid between the shaft 18 and a source of cryogenic fluid 24.

The illustrated power generation system 10 also comprises a steam turbine 26. In this embodiment, the steam turbine 26 comprises a high-pressure module 28, an intermediate-pressure module 30, and a low-pressure module 32. The high-pressure module 28, the intermediate-pressure module 30, and the low-pressure module 32 are coupled to a shaft 34. Steam flowing through the high-pressure module 28, the intermediate-pressure module 30, and the low-pressure module 32 induces rotation of the shaft 34. The steam loses pressure as it flows through the steam turbine 26. The high-pressure module 28, the intermediate-pressure module 30, and the low-pressure module 32 are adapted to operate at different steam pressures to improve the efficiency of the steam turbine 26. After passing through the low-pressure module, the steam is condensed into a liquid by a condenser 36.

The steam turbine 26 is provided to improve the efficiency of the power generation system 10 by using steam produced by the combustion products generated by the gas turbine system 12. The gas turbine system 12 has a plurality of heat recovery steam generator tubes 38 that extract heat from the combustion products produced by the gas turbine 16. The liquid condensate from the condenser 36 of the steam turbine 26 is pumped to the heat recovery steam generator tubes 38. The heat of the combustion products is transferred to the liquid, producing steam. The steam is then supplied to the steam turbine 26 to drive the shaft 34. The shaft 34 of the steam turbine 26 is coupled to the shaft 18 of the gas turbine 12 by a flexible coupling 40. The flexible coupling 40 couples the two shafts 18 and 34, while enabling the shafts 18 and 34 to have a degree of relative movement.

Figure 2:
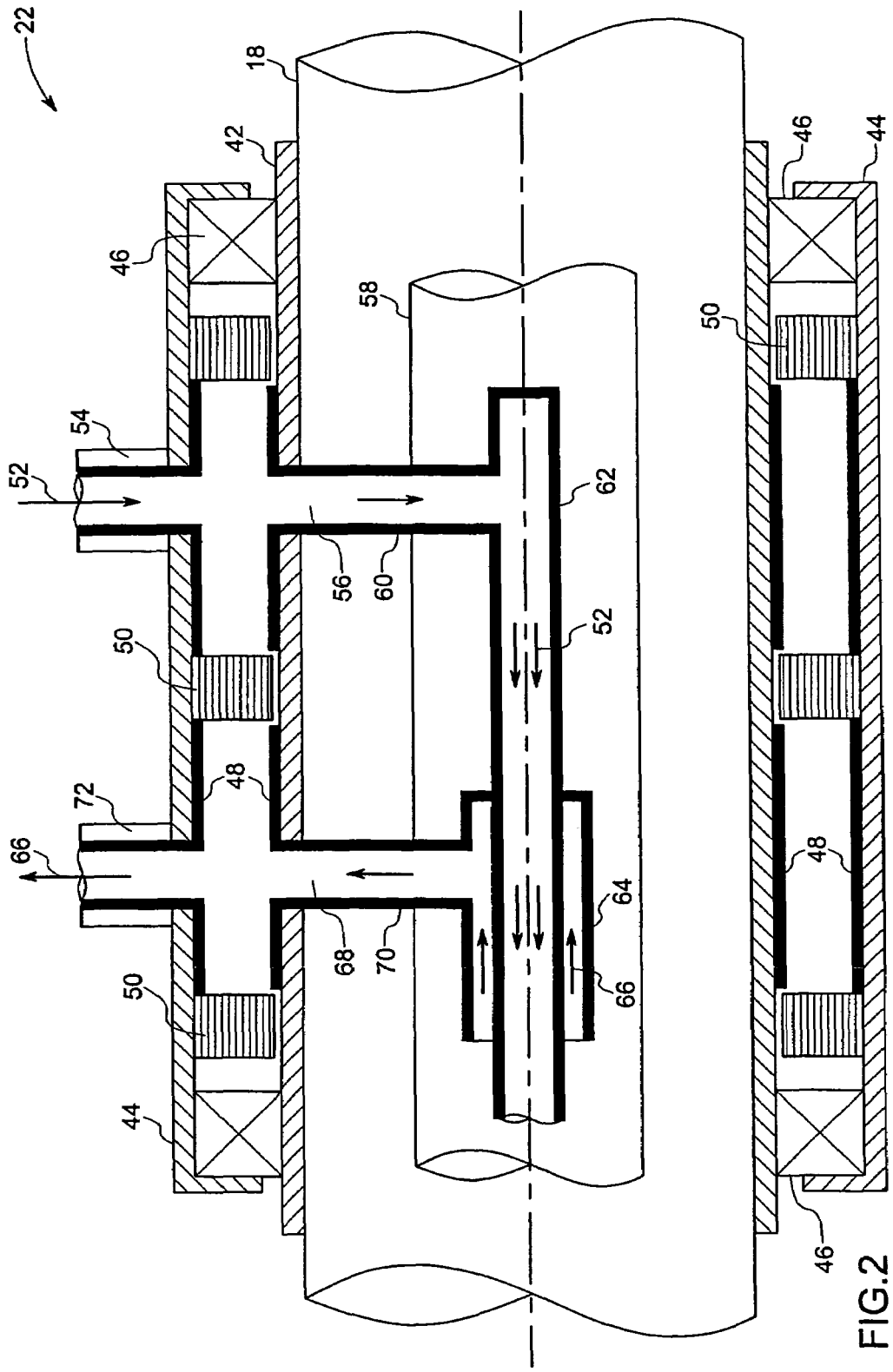
FIG. 2 is a cross-sectional view of a cryogenic fluid transfer coupling, taken generally along line 2-2 of FIG. 1.

Referring generally to FIG. 2, a cross-sectional view of the cryogenic transfer coupling 22 is provided. The cryogenic transfer coupling 22 is disposed around the shaft 18 and enables cryogenic fluid to be transferred between the shaft 18 and the source of cryogenic fluid 24 illustrated in FIG. 1. The cryogenic transfer coupling 24 enables cryogenic fluid to be transferred to the shaft 18 at any point along the shaft 18, not just at either end of the shaft 18. The cryogenic fluid is usually an inert fluid, such as helium, neon, hydrogen or nitrogen. The temperature of the cryogenic fluid is generally below 30 K and preferably around 27 K.

The cryogenic transfer coupling 22 comprises a rotating collar 42 secured to the shaft 18 and a stationary collar 44 disposed around the rotating collar 42. Bearings 46 are provided to support the cryogenic transfer coupling 22 on the shaft 18. The stationary collar 44 has insulated annular walls 48. In general, all walls between the cryogenic fluid and ambient must be insulated. Insulation usually consists of double walls with vacuum and emissivity reduction in between. Seals 50 are provided to form a seal between the rotating components and the stationary components of the transfer coupling 22. The seals 50 may be contact or non-contact clearance seals, such as a ferro-fluidic seal, a brush seal, or a labyrinth seal. However, other types of seals 50 may be used. Cryogenic fluid 52 flows into the transfer coupling 22 through an inlet line 54.

The rotatable shaft 18 has an inlet passageway 56 that leads to a central passageway 58 extending axially though the shaft 18. In the illustrated embodiment, the inlet passageway 56 extends radially through the wall of the shaft 18 from the central passageway 58 to the transfer coupling 22. However, the inlet passageway 56 may be curved or have some other shape. All passageways with contact between ambient and cryogens (e.g., 56, 58) must have insulated walls (e.g., 60, 70, 62, 64), as stated above, to reduce the transfer of heat from the shaft 18 to the cryogenic fluid 52.

A first tube 62 and a second tube 64 are disposed in the central passageway 58 to enable cryogenic fluid 52, 66 to flow in two directions through the central passageway 58. The first tube 62 is disposed within the second tube 64 in a telescopic arrangement. The first tube 62 has an opening that is aligned with the inlet passageway 56 to enable cryogenic fluid 52 to flow into the first tube 62 from the inlet passageway 56. The first tube 62 directs cryogenic fluid 52 to the generator 20 illustrated in FIG. 1. Heated cryogenic fluid 66 flows from the generator 20 in the annulus formed between the first tube 62 and the second tube 64.

The shaft 18 has an outlet passageway 68 that extends radially outward through a wall of the shaft 18 from the central passageway 58 to the transfer coupling 22. The outlet passageway 68 enables cryogenic fluid 66 to flow radially out of the shaft 18 to the cryogenic transfer coupling 22. The outlet passageway 68 also has an insulated tube 70 that is disposed within the outlet passageway 68 to prevent heat transfer from the shaft 18 to the cryogenic fluid 66. The second tube 64 has an opening that is aligned with the outlet passageway 68 to enable cryogenic fluid 66 to flow from the second tube 64 to the outlet passageway 68. The transfer coupling 22 has an outlet line 72 that directs the cryogenic fluid 66 from the transfer coupling 22 to the source of cryogenic fluid 24 illustrated in FIG. 1.

In the illustrated embodiment, all tubes which are between cryogenic temperatures and ambient (e.g., 72, 54, the inlet tube 60, the first axial tube 62, the second axial tube 64, and the outlet tube 70) are doubled-walled and vacuum-sealed. Additional insulation may be provided on the outer surfaces of such tubes. A reflective metal, such as silver or MLI, may be coated on the inner vacuum walls of said tubes to reduce the emissivity of said tubes, thereby reducing radiative heat transfer from the tubes to the cryogenic fluid. We note that some boundaries, such as the one between tube 62 and 64, have small temperature gradients across them because cryogenic fluids are on both sides of the walls, and so lesser insulation may be employed in such cases.

Figure 3:
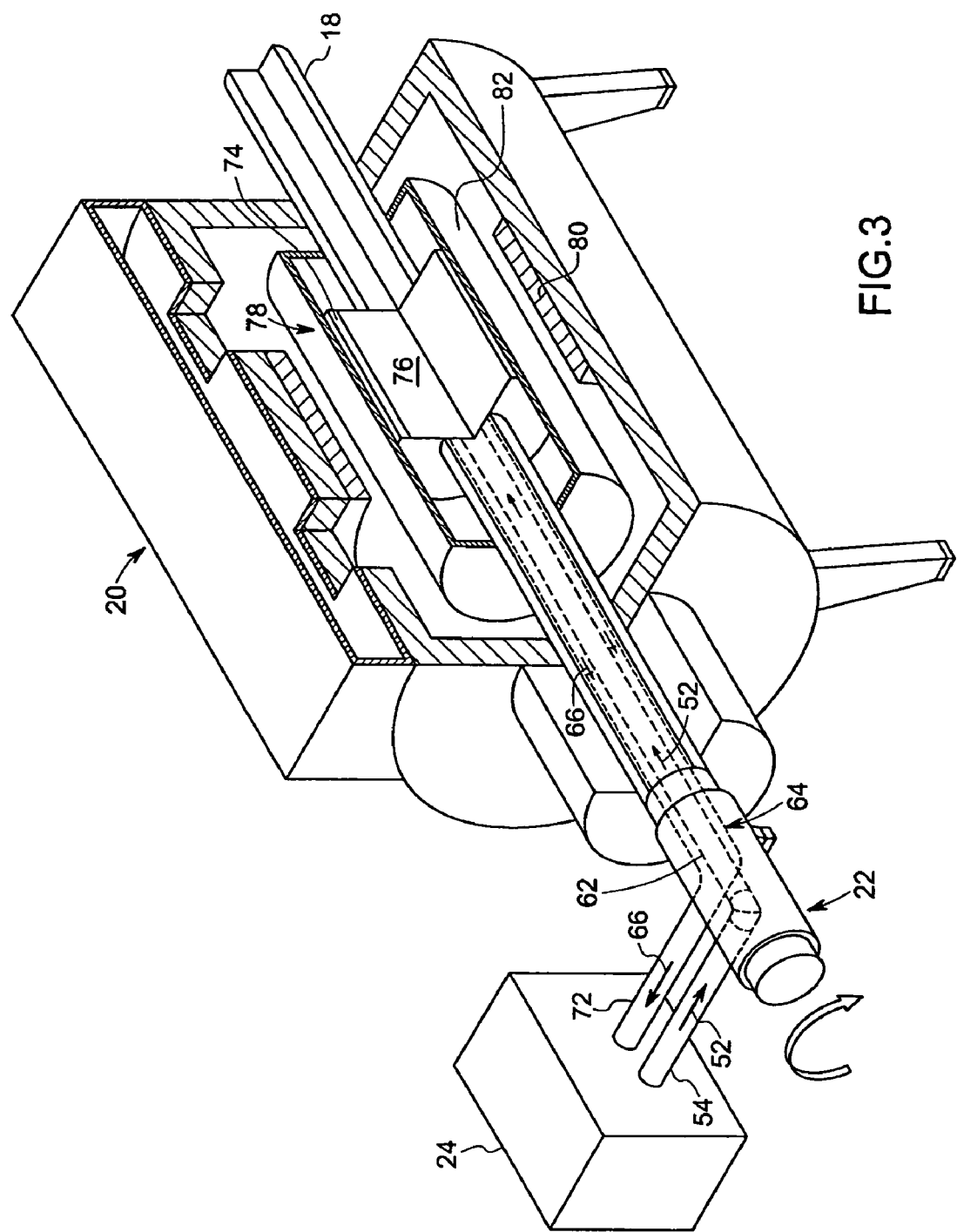
FIG. 3 is a perspective view of the generator and the cryogenic fluid transfer coupling, in accordance with an exemplary embodiment of the present technique.

Referring generally to FIG. 3, the cryogenic fluid 52 is used to cool a superconductive rotor coil 74 disposed within the generator 20. The superconductive rotor coil 74 is wound on a core 76 of a rotor 78. The generator 20 also comprises a stator 80 disposed circumferentially around the rotor 78. As the rotor 78 rotates within the stator 80, electrical current within the superconductive rotor coil 74 generates a magnetic field that induces a voltage within the stator 80.

The cryogenic fluid 52 cools the superconductive rotor coil 74 to maintain the coil 74 in a superconducting state. The source of cryogenic fluid 24 provides the force to induce the flow of cryogenic fluid 52 through the generator 20. In addition, the source of cryogenic fluid 24 removes the heat transferred to the cryogenic fluid 66 from the superconductive coil 74 and thermal leaks. As discussed above, the transfer coupling 22 supplies cryogenic fluid 52 through a side of the shaft 18, rather than axially through an end of the shaft 18. Similarly, the transfer coupling 22 receives cryogenic fluid 66 radially from the shaft 18, rather than from an end of the shaft 18.

The cryogenic fluid 52 flows through the first axial tube 62 within the shaft 18 to the rotor 78. The rotor 78 has a vacuum jacket 82 to insulate the rotor 78. The rotor 78 couples the cryogenic fluid 52 to the superconductive coil 74. The cryogenic fluid 52 removes heat from the superconductive coil 74 and maintains the coil 74 below the operating temperature to maintain the coil 74 in a superconducting state, i.e., with no electrical resistance. The rotor 78 then couples the warmed cryogenic fluid 66 to the annulus between the first axial tube 62 and the second axial tube 64. The warmed cryogenic fluid 66 is coupled through the transfer coupling 22 to the source of cryogenic fluid 24.

Heat transfer losses to the cryogenic fluid are minimized to conserve refrigeration power and to maintain the low operating temperatures needed for the superconductive coil 74 to remain superconducting. Heat losses are minimized by minimizing cooling fluid leakage and by minimizing heat transfer to the cryogenic cooling fluid.

Figure 4:
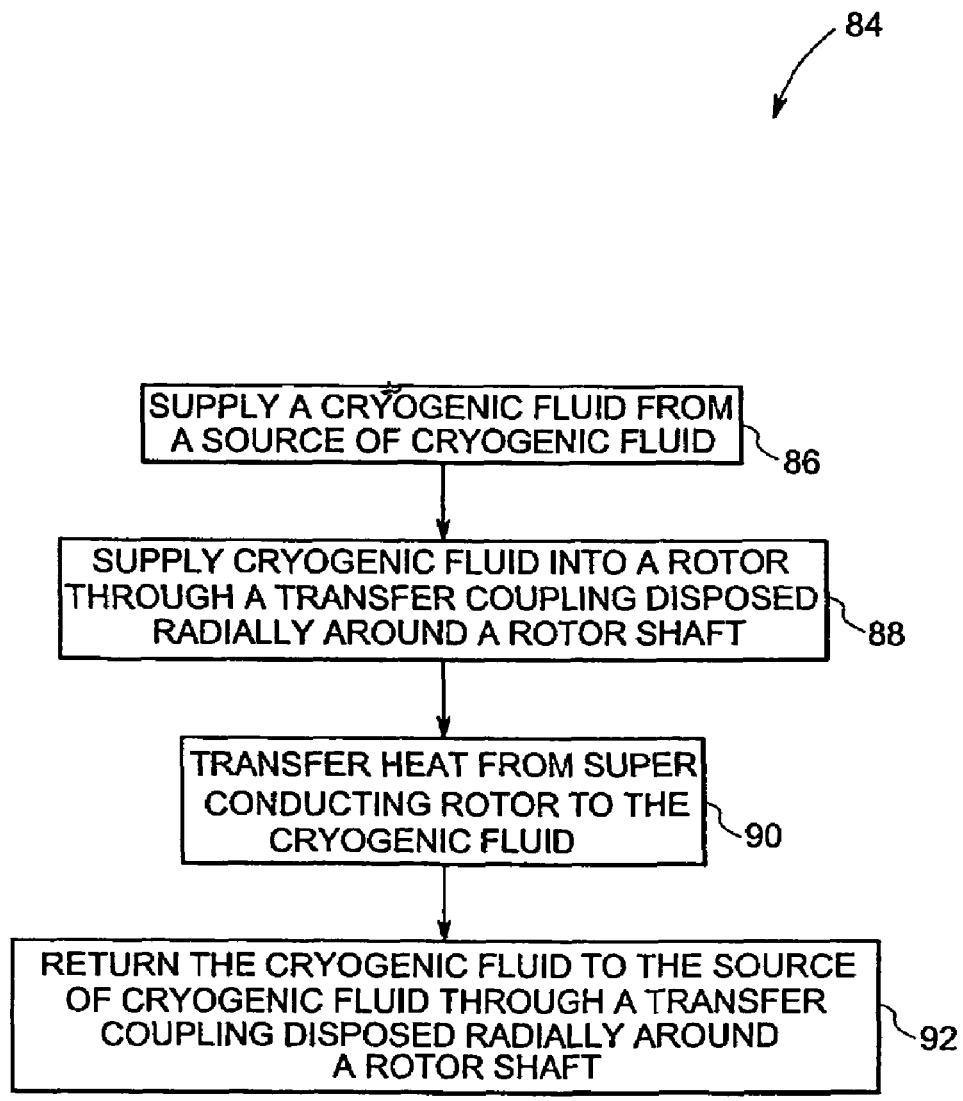
FIG. 4 is a block diagram illustrating a method of cooling a superconductive device, in accordance with an exemplary embodiment of the present technique.

Referring generally to FIG. 4, a method of cooling a superconducting rotor coil 74, represented generally by reference numeral 84, is provided. The method comprises supplying a cryogenic fluid from a source of cryogenic fluid to a cryogenic transfer coupling disposed radially around a rotatable shaft, as represented by block 86. The method also comprises supplying the cryogenic fluid from the transfer coupling to a superconductive rotor coil through an inlet passageway extending radially through the rotatable shaft, as represented by block 88. Heat is transferred from the superconductive rotor coil to the cryogenic fluid, as represented by block 90. The method also comprises returning the cryogenic fluid to the transfer through an outlet passageway extending radially through the rotatable shaft, as represented by block 92. From there the cryogenic fluid is returned to the source of cryogenic fluid.

Figure 5:
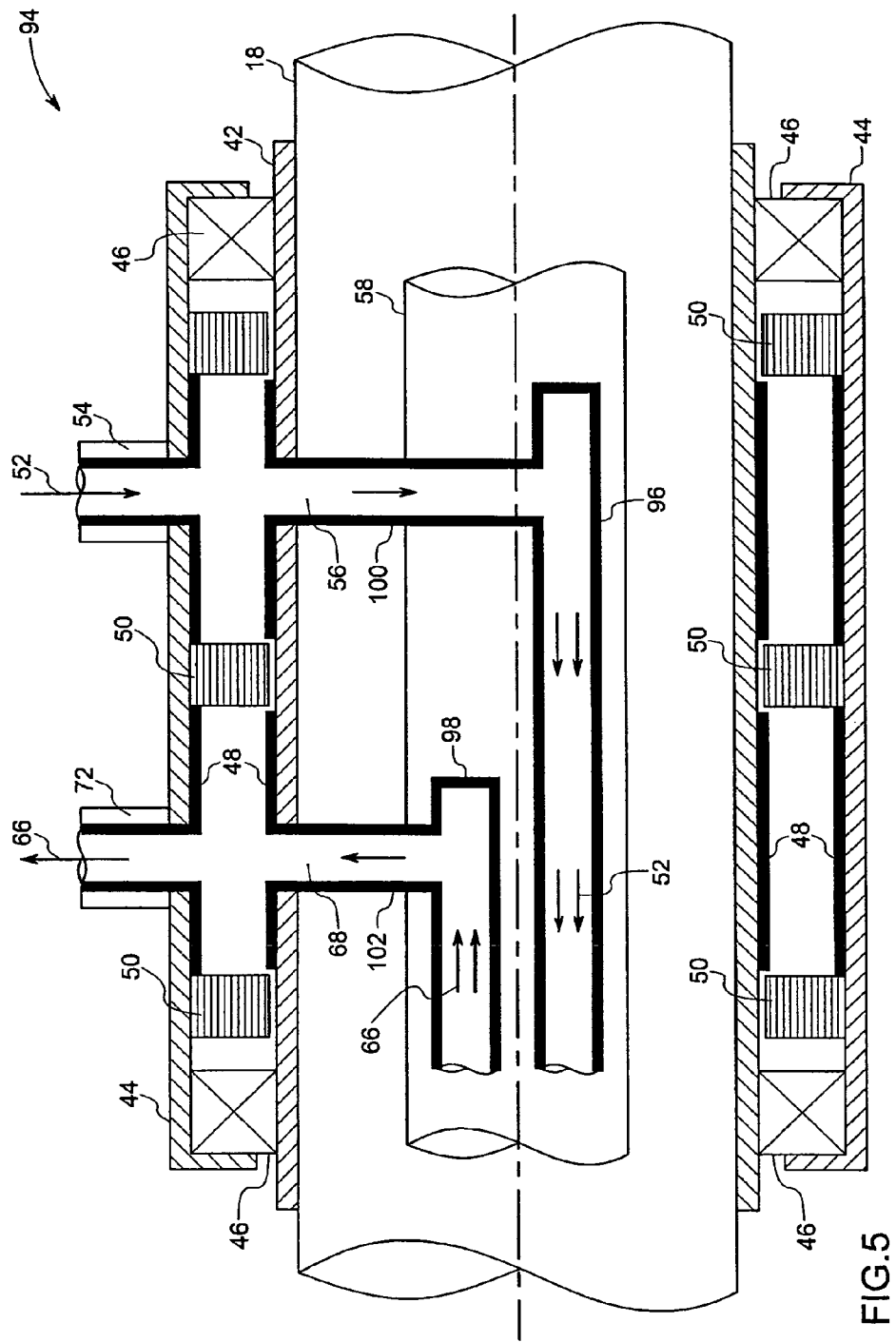
FIG. 5 is a cross-sectional view of an alternative embodiment of a cryogenic fluid transfer coupling, taken generally along line 2-2 of FIG. 1.

Referring generally to FIG. 5, an alternative embodiment of a cryogenic transfer system 94 is illustrated. In this embodiment, an alternative first axial tube 96 and an alternative second axial tube 98 are disposed within the rotatable shaft 18 in a side-by-side orientation, rather than a telescopic orientation. The rotatable shaft 18 is illustrated with a single central passageway 58. However, the rotatable shaft 18 may have separate passageways for the alternative first axial tube 96 and the alternative second axial tube 98. In addition, an alternative inlet tube 100 is used to couple the alternative first axial tube 96 to the transfer coupling 22 and an alternative outlet tube 102 is used to couple the alternative second axial tube 102 to the transfer coupling 22.

The techniques described above provide a system and method for supplying a superconductive rotor coil with cryogenic fluid from a location anywhere along the length of a rotor shaft. Thus, cryogenic fluid does not have to be transferred into the rotor shaft from an end position. This enables a generator to utilize a superconductive rotor coil even when there is no access to either end of the rotor shaft, such as the power generation system 10 illustrated in FIG. 1.

Figure 6:
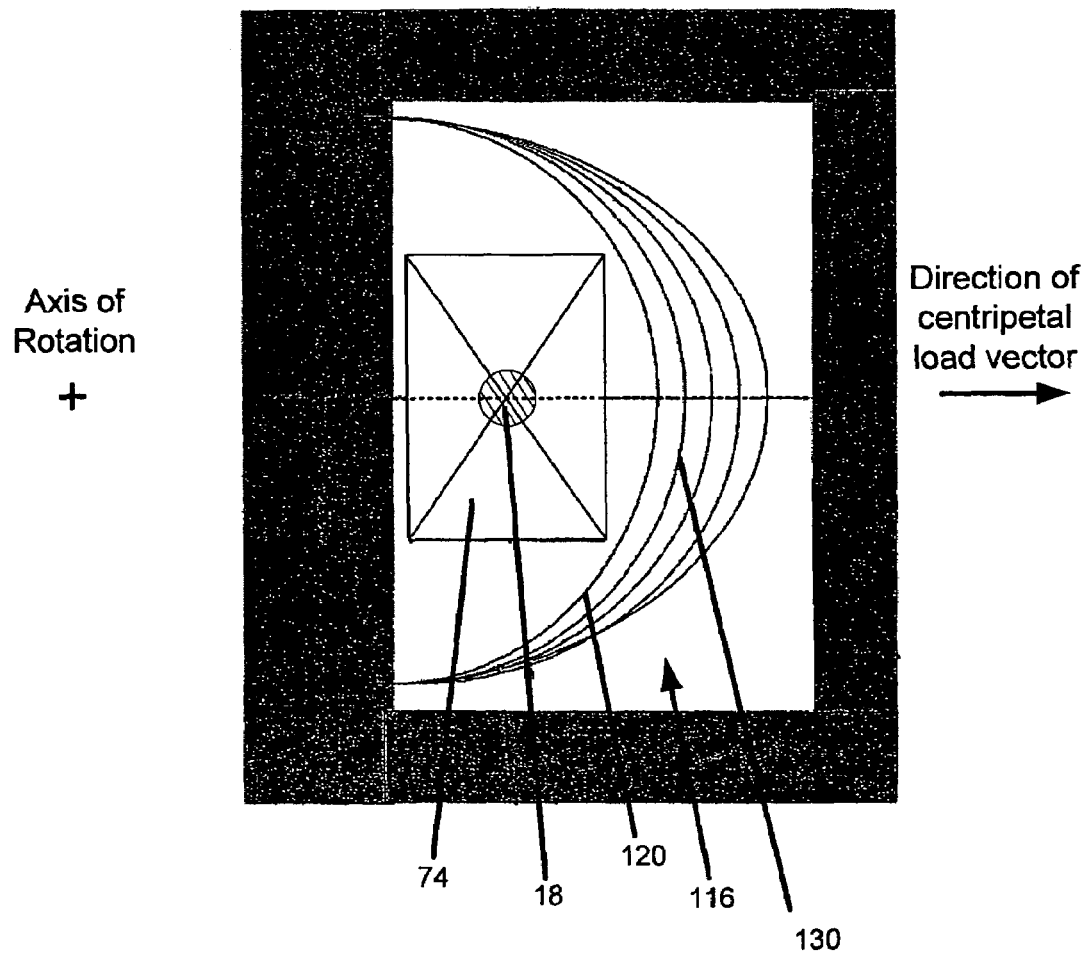
FIG. 6 is a schematic cross-sectional diagram of a thermal radiation shield for an electrical power device having a superconductive rotor coil coupled to a rotatable shaft.

FIG. 6 is a schematic cross-sectional diagram of a thermal radiation shield 110 for an electrical power device having a superconductive rotor coil 74 coupled to a rotatable shaft 18. The thermal radiation shield 110 may comprise: a first sheet 120 having at least one surface formed from a low emissivity material; at least one additional sheet 130 having at least one surface formed from a low emissivity material spaced apart from the first sheet by centripetal force produced by the rotatable shaft 18, wherein each successive sheet is an incrementally greater circumferential arc length and wherein the centripetal force shapes the sheets into a substantially catenary shape.

The spaced apart sheets 120, 130 of the shield 110 may form a series of low emissivity surfaces separated by vacuum 140. The first sheet 120 and the at least one additional sheet 130 of the shield may be of varied circumferential arc length, thereby forming the separated surfaces constituting a radiative barrier. The first sheet 120 of the shield may form a surface and the at least one additional sheet 130 form a surface around the first sheet 120. The low emissivity material of the surfaces of the sheets may comprise substantially aluminized MYLAR®. The shield 110 may include a heat resistant coating on at least of one the sheets. The thermal shield 110 may be under vacuum. The thickness of the sheets 120, 130 of the shield 110 may be between about 1 mils and 7 mils.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system, comprising:
   (a) a generator comprising a rotor including a superconductive rotor coil coupled to a rotatable shaft;
   (b) a first prime mover drivingly coupled to the rotatable shaft; and
   (c) a thermal radiation shield, partially surrounding the superconductive rotor coil, comprising at least a first sheet and a second sheet spaced apart from the first sheet by centripetal force produced by the rotatable shaft.

2. The system according to claim 1, further comprising a second prime mover drivingly coupled to the rotatable shaft; and a cryogenic transfer coupling disposed intermediate the first prime mover and the second prime mover to enable cryogenic fluid to be transferred to the superconductive rotor coil via the rotatable shaft.

3. The system according to claim 2, wherein the cryogenic transfer coupling is disposed radially around the rotatable shaft.

4. The system according to claim 3, wherein the rotatable shaft comprises an axial passageway extending through the rotatable shaft and an inlet passageway extending from a cylindrical surface of the rotatable shaft to the axial passageway.

5. The system according to claim 4, wherein the rotatable shaft comprises an outlet passageway extending from the cylindrical surface of the rotatable shaft to the axial passageway.

6. The system according to claim 2, wherein the second prime mover comprises a steam turbine.

7. The system according to claim 1, wherein the first prime mover comprises a gas turbine.

8. The system of claim 1, wherein each successive sheet has an incrementally greater circumferential arc length and wherein the centripetal force shapes the sheets into a substantially catenary shape.

9. The system of claim 1, wherein the first sheet comprises a first surface and the second sheet comprises a second surface around the first sheet.

10. The system of claim 1, wherein the first and second sheets are spaced apart to form a series of low emissivity surfaces separated by vacuum.

11. A thermal radiation shield for an electrical power device having a superconductive rotor coil coupled to a rotatable shaft, the thermal radiation shield comprising:

(a) a first sheet having at least one surface formed from a low emissivity material; and (b) at least one additional sheet having at least one surface formed from a low emissivity material spaced apart from the first sheet by centripetal force produced by the rotatable shaft, wherein each successive sheet is an incrementally greater circumferential arc length and wherein the centripetal force shapes the sheets into a substantially catenary shape.

12. The thermal radiation shield of claim 11, wherein the spaced apart sheets form a series of low emissivity surfaces separated by vacuum.

13. The thermal radiation shield of claim 11, wherein the first sheet forms a first surface and the at least one additional sheet forms at least a second surface around the first sheet.

14. The thermal radiation shield of claim 13, wherein the first sheet and the at least one sheet are of varied circumferential arc length, and wherein the first surface and said second surface are separated to consititute a radiative barrier.

15. The thermal radiation shield of claim 11, wherein the low emissivity material is substantially aluminized material.

16. The thermal radiation shield of claim 11, further including a heat resistant coating on at least of one of the first sheet and the at least one additional sheet.

17. The thermal radiation shield of claim 11, wherein the thermal radiation shield is under vacuum.

18. The shield of claim 11, wherein the thickness of each of the first sheet and the at least one additional sheet is between about 1 mils and 7 mils.

19. A power generation system, comprising:
   (a) a generator comprising a rotor including a superconductive rotor coil coupled to a rotatable shaft;
   (b) a first prime mover drivingly coupled to the rotatable shaft; and
   (c) a thermal radiation shield, partially surrounding the superconductive rotor coil, comprising:
      (i) a first sheet having at least one surface formed from a low emissivity material;
      (ii) at least one additional sheet having at least one surface formed from a low emissivity material spaced apart from the first sheet by centripetal force produced by the rotatable shaft, wherein each successive sheet is an incrementally greater circumferential arc length, and wherein the centripetal force shapes the sheets into a substantially catenary shape
   (d) a second prime mover drivingly coupled to the rotatable shaft; and a cryogenic transfer coupling disposed intermediate the first prime mover and the second prime mover to enable cryogenic fluid to be transferred to the superconductive rotor coil via the rotatable shaft.

20. The system according to claim 19, wherein the cryogenic transfer coupling is disposed radially around the rotatable shaft.

21. The system according to claim 20, wherein the rotatable shaft comprises an axial passageway extending through the rotatable shaft and an inlet passageway extending from a cylindrical surface of the rotatable shaft to the axial passageway.

22. The system according to claim 21, wherein the rotatable shaft comprises an outlet passageway extending from the cylindrical surface of the rotatable shaft to the axial passageway.

23. The system according to claim 19, wherein the first prime mover comprises a gas turbine.

24. The system according to claim 19, wherein the second prime mover comprises a steam turbine.

25. The shield of claim 19, wherein the spaced apart sheets form a series of low emissivity surfaces separated by vacuum.

26. The shield of claim 19, wherein said plurality of sheets are of varied circumferential arc length, thereby forming said separated surfaces contituting a radiative barrier.

27. The shield of claim 19, wherein the first sheet forms a surface and the second sheet forms a surface around the first sheet.

28. The shield of claim 19, wherein the low emissivity material is substantially aluminized material.

29. The shield of claim 19, further including a heat resistant coating on at least of one said sheets.

30. The shield of claim 19, wherein the thermal shield is under vacuum.

31. The shield of claim 19, wherein the thickness of the sheets is between about 1 mils and 7 mils.

* * * * *